Patented Sept. 27, 1927.

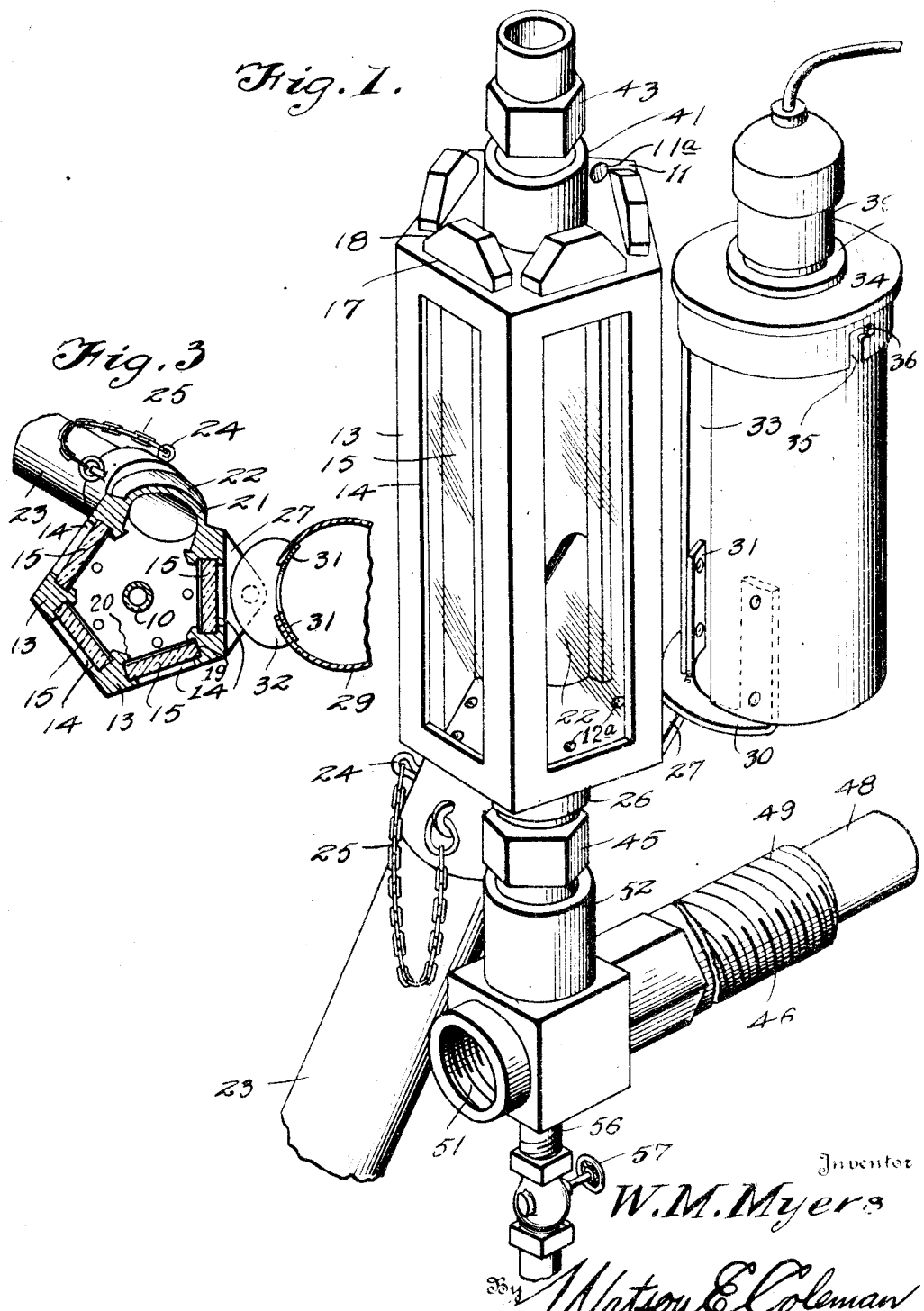

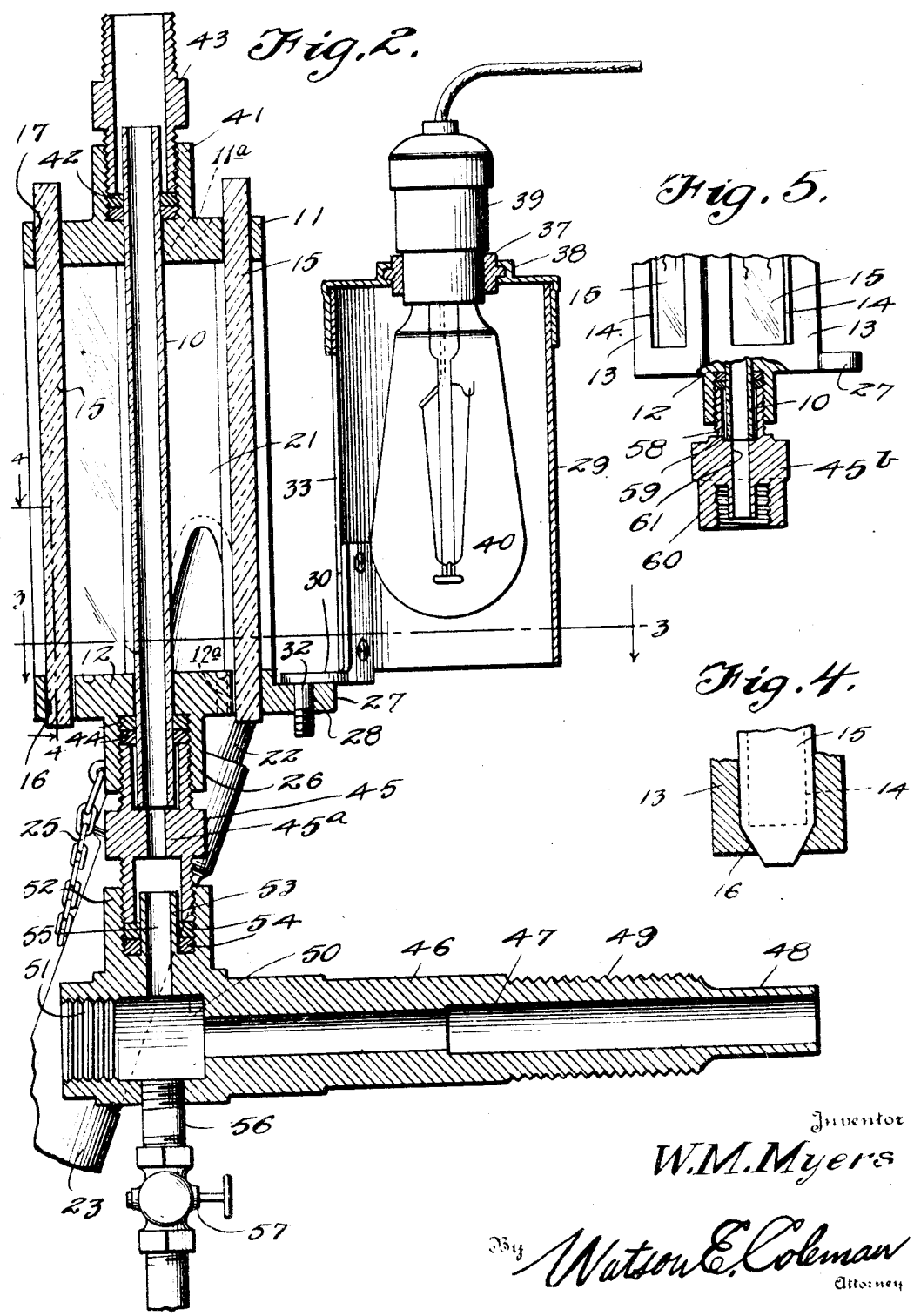

1,643,467

UNITED STATES PATENT OFFICE.

WARREN M. MYERS, OF SAGINAW, MICHIGAN.

SAFETY WATER GAUGE.

Continuation of application Serial No. 735,382, filed September 2, 1924. This application filed May 13, 1926. Serial No. 108,892.

This invention relates to water gauges, and particularly to a water gauge for use on locomotives, this application being a continuation of application, Serial No. 735,382, filed by me on the 2nd of September, 1924.

One of the objects of the invention is to provide a water gauge so constructed that it may be readily observed from at least three points within the locomotive cab, one from the right hand or engineer's seat, one from the left hand or fireman's seat, and one from the rear, this being in accordance with the requirements of the law.

A further object is to provide means whereby the water gauge may be illuminated so that the height of the water within the gauge may be readily seen under all circumstances.

A still further object is to provide a housing for the gauge glass, the housing being provided in its upper and lower heads with vent ports whereby cool air may flow upward into the housing through the lower ports and carry any steam which may leak past the packing and the gauge glass upward to the upper port to thus prevent the sight glasses from being obscured by condensed vapor.

Another object is to provide means whereby the sight glasses may be readily removed and particularly to so construct the sight glass openings in the bottom head that the sight glasses may extend partially through these openings and below the bottom head so that when a sight glass sticks, it can be tapped at the bottom end to loosen it and then the sight glass may readily be pulled out of the top head, and another object in this connection is to bevel the lower ends of the sight glasses and the seats on which they rest so that when the water glass breaks or blows out steam pressure cannot get under the beveled ends of the glasses and push these glasses upward.

Another object is to provide an illuminating means which is so constructed that it may be readily removed or replaced and may be used as a trouble lamp, and in which the electric lamp is so insulated that no short circuit can occur.

Still another object is to provide a lamp which will illuminate the deck or floor of the cab so that the fireman can shake grates, crack coal, and clean the deck without any ray of light being in his eyes.

A further object is to provide a waste pipe extending from the water gauge, which pipe is readily removable but is normally held in place by a cotter pin.

A still further object is to cast the inside of the case in ridges so that if the water glass blows out the glass will come in contact with these rough edges and be pulverized and thus pass out of the waste pipe without clogging it up.

Other objects have to do with the details of construction and arrangement of parts as will appear more fully hereinafter.

My invention is illustrated in the accompanying drawings, wherein :—

Figure 1 is a perspective view of a gauge glass constructed in accordance with my invention and its allied parts;

Figure 2 is a vertical sectional view diametrically through the gauge glass and through the lamp housing;

Figure 3 is a section on the line 3—3 of Figure 2;

Figure 4 is a fragmentary section of the lower portion of the gauge glass on the line 4—4 of Figure 2;

Figure 5 is an elevation of the lower portion of the gauge glass housing, the lower end of the gauge glass proper and the housing therefor being in section, the lower end of the housing being shown as fitted with an alternate type of connection to be employed when the gauge glass is used with the ordinary male valve now in use.

Referring to these drawings, it will be seen that I have illustrated a gauge glass for locomotives wherein the gauge glass 10 is mounted within a housing comprising the upper head 11 and the lower head 12. These upper and lower heads are connected by means of integral, angular corner pieces 13 which, with the upper and lower heads, define rectangular openings 14 within which are disposed the sight glasses 15. The lower head is formed, as illustrated in Figure 4, with downwardly tapering recesses or seats 16, while the upper head is formed with rectangular slots 17. The sight glasses at their upper and lower ends are tapered on the side edges so as to provide two converging side edges 18 and these tapering ends fit loosely within the seats 16. These sight glasses 15 are sufficiently thinner than the width of the seat 16 or of the slot 17 as to permit the passage of air through the seat 16 and past the sight glasses 15, and the upper ends of the sight glasses fit within the slot 17 sufficiently loosely so that any air or steam may pass out. As a further means of preventing condensation collecting on the gauge glass 10 or on the inside faces of the sight glasses and thus obscuring the sight therethrough, I provide a port 11ª in the upper head 11, which port in actual practice will have a diameter of approximately a quarter of an inch, and provide a plurality of ports 12ª in the lower head 12, these ports extending through the lower head and opening, one adjacent each sight glass 15. These ports have preferably a diameter of three-sixteenths of an inch. By providing cold air ports, in the lower head and a relatively large escape port in the upper head cool air will pass upward through the lower head and will carry the steam out through the upper head. This will prevent any steam striking the sight glasses and thus leaving the sight glasses clear at all times. These ports in the upper and lower head slant so as to prevent any glass from being blown directly out through these ports in case of a bursting of the gauge glass.

It will be noted that port 11ª being arranged to slant upward and outward will discharge any steam outward from the housing in a direction away from the shut-off valve not shown which ordinarily is located in the pipe between the nipple 43 and the steam space of the boilers. Thus, while steam is escaping through passage 11ª the engineer can shut off the upper steam valve without scalding his hands. This steam may come from either a broken water glass or from a leak around the gaskets 42. At the same time the passageways 11 and 12ª permit air circulation.

It is to be noted that as shown in Fig. 2 and Fig. 4, the lower beveled ends of the sight glasses project down below the lower face of the lower head and the sight glasses project above the upper face of the upper head, thus in case it is desired to remove a sight glass, the sight glass can be tapped at the lower end with a piece of wood to loosen the glass and then inasmuch as the glass projects above the top head, it may be readily pulled out. If the sight glasses had square lower ends, seating inside of the head or merely resting upon the bottom of the lower head in sockets or seats, then if the water glass or gauge glass 10 broke or blew out, steam, under pressure, would get under the square end of the sight glass, forcing the sight glass upward and outward, thus allowing steam, water and broken glass to blow out into the cab with danger to the crew. Not enough steam pressure can get under the beveled end of my sight glass to move it upward as there is not enough surface presented to permit pressure to move it.

If the water glass 10 breaks and steam under boiler pressure fills the housing, it will drive under the edge 16 and try to lift the glasses 15, but the upward force of the steam is dispelled as soon as the glass 15 starts to go upward because the beveled lower corners at once expose a triangular opening for the escape of the steam as shown in dotted lines in Figure 4, thus the glass 15 cannot jump out through slot 17.

As shown in Figures 1 and 3, the gauge glass is approximately a pentagon in cross section, and on four of its sides is provided with the openings 14 and the sight glasses or panes 15, each of these sight glasses being held in place by having its side edges engaged in grooves 19 in the side walls defining the openings 14. The corner pieces 13 extend inward beyond these gauge glasses and the ribs 20 thus formed are sharp-cornered. It will be understood that the housing formed by the upper and lower heads and the members 13 is preferably cast in one piece. This housing on its fifth side is formed to provide a vertical wall 21 from which extends downwardly outwardly and laterally a waste pipe section 22 adapted to receive upon it the waste pipe sleeve 23. The upper end of this waste pipe sleeve and the lower end of the section 22 are formed with aligning apertures through which a cotter pin 24 may be passed, this cotter pin being prevented from loss by means of a chain 25 attached to the upper end of the waste pipe section 23.

The lower head 12 is formed with a downwardly extending, internally screw-threaded flange 26, and this head 12 at one point and in front of one of the openings 13 is laterally extended, as at 27, and formed with a vertical aperture 28 for the support of a lamp housing 29. This lamp housing is made of sheet metal and at its lower end this sheet metal is mounted upon a base 30. This base is arcuate and has upwardly extending ears 31 which engage inside the lamp housing, and this base is formed with a downwardly extending pin 32 adapted to pass through the aperture 28. This pin is preferably screw-threaded to keep vibration from shaking the pin out of place. The lamp housing is not a complete circle but the material is so formed as to provide a longitudinally extending slit 33 opposite a pane 15 so that the light may be directed inward and strike the gauge glass 10.

Particular attention is called to the fact that the lamp base 30 by means of the ears 31 holds the sheet metal housing 29 in shape at the lower end of slit 33.

The upper end of the housing is formed by a cap 34 having a downwardly extending annular flange formed with bayonet joint slots 35 engaging pins 36 projecting from the housing wall 29. The cap is also formed with a central aperture wherein is disposed a packing ring 37 held in place by a flange 38, and extending above and below the flange and mounted within this packing ring is the socket 39 carrying an electric lamp 40 connected by the usual cord to a source of energy. By extending packing ring 37 above and below the flange 38 all contact between the base of the lamp bulb and the cap is prevented and the lamp is positively insulated from any contact with this metallic cap. While I have shown a packing ring which extends below the top of the housing 29 and above the flange 38, it is sufficient that the packing ring be formed with an annular rib to engage within the flange 38. A flexible ring of rubber which will permit the electric light socket to be pushed into position or pulled out, is all that is necessary for insulating the electric light from the housing 29.

The upper head 11 of the gauge glass housing is formed with an upwardly extending flange 41 which is internally screw-threaded and forms a packing gland, at the lower end of which is disposed a packing 42 which tightly surrounds the pipe 10. A packing nut 43, which is screw-threaded at its opposite ends and has a medially disposed, many-sided portion whereby a wrench may be applied to the nut, has its lower end screwed into the packing gland 41 and bears upon the packing. Obviously, by tightening up this nut, the packing may be compressed and this packing nut provides for a boiler connection.

The lower head 12, as before stated, is formed with a flange 26 constituting a gland, and disposed within this gland is the packing 44. Engaged with the gland is the double nipple 45 exteriorly screw-threaded at opposite ends and having a medially disposed, many-sided portion whereby a wrench may be applied and having a medially disposed annular shoulder 45ª defining a central passage and upon which the lower end of the gauge glass 10 rests, this gauge glass passing through the packing 44.

Coacting with the lower end of the nipple 45 is a double nipple, designated generally 46, this nipple having a longitudinally extending bore 47. This nipple may terminate at one end in a male portion 48, the nipple being exteriorly screw-threaded at 49 inward of this male portion. The opposite end of the nipple is formed with a chamber 50 into which the bore 47 opens and beyond this chamber it is interiorly screw-threaded, as at 51. Extending at right angles to the duct 47 is the socket flange 52 which is interiorly screw-threaded for engagement with the exterior screw-threads of the nipple 45, and disposed concentrically to this flange is an upstanding annular flange 53 constituting a packing centering flange. Disposed around this central supporting flange 53 and between it and the socket or flange 52 are the packing rings 54 which are, of course, engaged by the extremity of the nipple 45. Directly opposite the bore 55 and in alinement with the bore of the gauge glass there is a screw-threaded opening from which a pipe 56 extends having therein a valve 57. This pipe extends down through the deck and by opening the valve any sediment collected in the pipe or gauge glass is blown out.

The advantages of this device are as follows: The law requires that the water level in the gauge glass shall be capable of observation from three points in the locomotive cab, one from the right hand or engineer's seat, one from the left hand or fireman's seat, and from the rear. My improved gauge has four sight glasses 15 and the gauge light is disposed so that there are three points of view which are unobstructed at all times. Any steam leaking past the packing 42 or 44 will pass out of the port 11ª and will thus not condense upon the sight glasses. The illuminating device for my gauge glass, namely the housing 29 with the electric light inside it, can be removed and replaced, and furthermore can be used as a trouble light. Furthermore, the lamp itself is insulated from the housing 29 so that no short circuit can possibly occur. The lower end of the gauge glass lamp housing 29 is open so that a light is directed downward on the deck. The fireman can thus shake the grate, crack coal, and clean the deck without any rays of light directly in his eyes. It will be seen that cold air can enter around the lower ends of the sight glasses and through the ports 12ª and this cold air will force all the hot air and steam upward and out of the port 11ª and upper head, thus leaving the sight glasses and the gauge glass itself entirely clear.

By reference to Figure 3, it will be seen that the interior of the housing for the gauge glass is so cast as to form ridges 20 so that if the water glass blows out the glass will come in contact with these rough edges and be pulverized and pass out of the waste pipe 23 without clogging it up. It will be seen that my improved device provides a complete safety water gauge which may be sold complete and installed in any boiler. Of course, it will be understood that the usual valves are used whereby the passage of the water to the gauge glass may be cut off or permitted.

In Figure 5, I have illustrated in section a form of connection which may be employed where it is desired to connect the gauge to the male valve now in use on locomotive boilers. This connection comprises a double nipple 45ª cast in blank having at one end a male connection 58 adapted to enter the female connection 26. This male connection is provided with a short bore 59 of slightly greater size than the gauge glass. The lower end of the nipple is in the form of a female connection into which projects from the center of the connection a central positioning flange 60 employed for positioning packing after the manner of the supporting flange 53 hereinbefore described. This female connection is for the purpose of receiving the male valve above referred to and not herein illustrated and the entire connection has an axial central bore 61 of the same diameter as the interior of the gauge glass. It will be obvious that the female connection may be employed for packing about the gauge glass in the same manner as the upper end of the connection 45 is employed.

It will be seen that the member 45 holds the packing rings 44 and 54 in place and that as the gauge glass 10 extends down below the packing ring 44 and rests upon the seat 45$^a$ no packing can get over the water port and that the same is true with regard to the packing 54 which cannot get up over the portion 53. This obstruction of the lower end of the gauge glass by packing is quite common and leads to the scorching of boiler sheets. This cannot occur where the gauge glass extends downward within the member 45 and rests upon the shoulder 45$^a$.

Attention is called to the advantages present in the use of the parts 45 and 46 with the gauge glass housing. The tap 46 communicates with the boiler and has to stand a pressure of about 200 lbs. which is held back by the valve and its screw-threads 51 but not shown. To replace a broken gauge glass, the housing is disconnected from the steam pipe 43 and from the boiler tap 46 by unscrewing the coupling nipple 45. The housing may then be removed and held in the engineer's hands. The new glass 10 is then inserted through the upper head and the packing placed around the glass and then the packing 44 is inserted around the other end of the gauge glass. Inasmuch as the housing is being held in the engineer's hands, he can seen that no packing gets into the glass 10. He then inserts the packing 54 around the guide 55 and this prevents any packing from getting into the water passage. Then he holds the housing upright and screws the nipple 45 into the flange 52 and then connects the nipple or coupling 45 with the boiler.

I claim:—

1. A water gauge for steam boilers comprising a housing having opposed heads and connecting portions, the upper and lower heads having slots extending entirely through them, the lateral walls of the lower slots being convergent, and sight glasses disposed in said slots, said glasses at their upper ends extending through the upper slots and above the upper head and at their lower ends being downwardly beveled on their lateral faces to seat on the convergent walls of the slots in the lower head and the sight glasses extending below the lower head.

2. A water gauge for steam boilers comprising a housing having opposed heads and connecting portions, the upper and lower heads having slots, the lateral faces of each slot in the lower head being downwardly convergent, sight glasses having their upper ends disposed through the slots in the upper heads and having their lower ends beveled to rest upon said convergent faces of the lower slots as upon seats and extending below the lower head, both the upper and lower slots having a cross sectional area greater than the cross sectional area of the sight glasses to thereby permit air to enter the lower end of the gauge glass housing and pass upward and outward around the upper ends of the sight glasses.

3. A water gauge for steam boilers comprising a many sided housing, sight glasses disposed in the walls of said housing, a gauge glass extending longitudinally through the housing, and means for illuminating the gauge glass comprising a lamp housing open at its lower end and having a slot facing toward the housing of the water gauge and discharging light through one of said sight glasses, the lower head of the gauge glass housing being laterally extended and vertically apertured and the lamp housing having a laterally extending supporting bracket attached to the outer wall of the housing and formed with an integral downwardly projecting stud engageable in said aperture and screw threaded at its lower end.

4. A water gauge for steam boilers comprising a housing including transparent walls, a gauge glass extending longitudinally through the housing, and means for illuminating the gauge glass comprising a cylindrical lamp housing open at its lower end and having a longitudinally extending slot discharging light toward the gauge glass housing, said lamp housing at its lower end having means whereby it may be detachably engaged with the gauge glass housing, a cap detachably engaging the upper end of the cylindrical housing and having a central aperture and a flange concentric to the aperture, an insulating bushing disposed within said opening of the cap and having an outwardly extending portion engaging said flange, said bushing extending above the flange and below the inner face of the cap, and an electric lamp having a base insertible through said insulating bushing and bearing upon the upper end thereof.

5. A water gauge for steam boilers comprising a housing having transparent walls and including upper and lower heads and portions connecting the heads, a gauge glass disposed in the housing and extending downward through the lower head, the lower head being formed with an annular interiorly screw-threaded flange, packing disposed within the flange and bearing against the gauge glass, a nipple whereby to connect the water gauge to the boiler having at one end an upwardly extending interiorly screw-threaded gland, the center of the gland being formed with an upwardly extending annular flange, and a tubular member connecting the gland with the interiorly screw-threaded flange on the lower head, said member having screw-threads at its opposite ends and having its middle portion inwardly extended to provide annular shoulders less in interior diameter than the exterior diameter of the gauge glass and upon the upper end of which said gauge glass rests, the lower end of said tubular member having screw-threaded engagement with the interiorly screw-threaded gland and surrounding the annular flange of said gland.

6. A water gauge for steam boilers comprising a housing having transparent walls and including upper and lower heads, a gauge glass disposed in the housing and extending downward through the lower head, the lower head being formed with an annular interiorly screw-threaded flange, packing disposed within the flange and at the base thereof and bearing against the gauge glass, a nipple whereby to connect the water gauge to the boiler, and having at one end an upwardly extending interiorly screw-threaded gland, the nipple being formed with an upwardly extending flange concentric to said gland and a tubular member connecting the nipple to the bottom of the housing having screw-threads at its opposite ends and engaging the flanges of the nipple and lower head respectively and bearing against the packing therein, said member having its middle portion inwardly extended to provide annular shoulders less in interior diameter than the exterior diameter of the gauge glass and upon which the lower end of said gauge glass rests.

7. A water gauge for steam boilers including a gauge glass, transparent shielding means therefor, a lower head having an outwardly projecting lug, a lamp housing including a side wall split from top to bottom and a cap surrounding the upper end of the side wall acting to hold the upper end of the side wall in shape, the cap having means for supporting an electric lamp, a plate having a pair of upwardly extending ears attached to the lower end of the housing on each side of the slit and thus acting to hold the lower end of the housing in shape and a pin on the plate extending through the ear on said head.

In testimony whereof I hereunto affix my signature.

WARREN M. MYERS.